(12) United States Patent
Karolak

(10) Patent No.: US 12,046,046 B2
(45) Date of Patent: Jul. 23, 2024

(54) TAGGING OBJECTS WITH FAULT OVERRIDE PATTERNS DURING CALIBRATION OF VEHICLE SENSING SYSTEMS

(71) Applicant: MAGNA ELECTRONICS, LLC, Southfield, MI (US)

(72) Inventor: Paul Karolak, Brighton, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 535 days.

(21) Appl. No.: 17/226,467

(22) Filed: Apr. 9, 2021

(65) Prior Publication Data

US 2022/0327319 A1   Oct. 13, 2022

(51) Int. Cl.
*G06V 20/59*   (2022.01)
*B60W 40/09*   (2012.01)
(Continued)

(52) U.S. Cl.
CPC ............. *G06V 20/58* (2022.01); *B60W 40/09* (2013.01); *G06V 20/59* (2022.01); *G06V 20/597* (2022.01);
(Continued)

(58) Field of Classification Search
CPC ...... G06V 20/597; G06V 20/59; G06V 20/58; G06V 40/172; G06V 40/19; G06V 40/20; G06V 20/56; G06V 20/588; G06V 40/165; G06V 10/143; G06V 10/82; G06V 40/168; G06V 40/16; G06V 40/18; G06V 40/193; G06V 10/764; G06V 10/774; G06V 10/98; G06V 20/593; G06V 40/10; G06V 40/161; G06V 40/171; G06V 40/50; G06V 10/141; G06V 20/40; G06V 40/103; G06V 40/166; G06V 40/70; G06V 10/147; G06V 10/454;
(Continued)

(56) References Cited

U.S. PATENT DOCUMENTS 10,846,549 B2 * 11/2020 Zhou ...................... H04N 1/626
2005/0090957 A1 * 4/2005 Luo .................... B60R 21/01538
701/45

(Continued)

OTHER PUBLICATIONS

International Search Report and Written Opinion from corresponding International Application No. PCT/US2022/022984 mailed Sep. 19, 2022.

*Primary Examiner* — Ian L Lemieux

(57) ABSTRACT

A vision sensing system of a vehicle comprising a camera, an object detection module, and a calibration module. The object detection module is configured to detect a first object in data received from the camera. The calibration module is configured to calibrate the object detection module to detect the first object in the presence of a second object that obstructs a view of the camera and that includes a predetermined pattern sensed by the camera. A driver monitoring system for a vehicle comprises a camera and a driver monitoring module. The camera is arranged proximate to a steering wheel of the vehicle to monitor a face of a driver of the vehicle. The driver monitoring module is configured to detect an obstruction between the camera and the face of the driver and to ignore the obstruction in response to the obstruction including a predetermined pattern sensed by the camera.

20 Claims, 6 Drawing Sheets

(51) Int. Cl.
  *G06V 20/58* (2022.01)
  *G06V 20/80* (2022.01)
  *G06V 40/16* (2022.01)
  *B60W 40/08* (2012.01)
(52) U.S. Cl.
  CPC ............ *G06V 20/80* (2022.01); *G06V 40/165*
  (2022.01); *G06V 40/172* (2022.01); *B60W*
  *2040/0872* (2013.01)
(58) Field of Classification Search
  CPC .... G06V 10/806; G06V 20/46; G06V 20/582;
  G06V 20/80; G06V 2201/07; G06V
  40/107; G06V 40/12; G06V 40/1365;
  G06V 40/174; G06V 40/178; G06V
  40/28; G06T 2207/30252; G06T 7/80;
  G06T 7/70; G06T 2207/10016; G06T
  2207/30196; G06T 2207/30208; G06T
  2207/30244; G06T 2207/30261; G06T
  2207/10028; G06T 2207/20081; G06T
  2207/30236; G06T 2207/30248; G06T
  2207/30256; G06T 2207/30268; G06T
  7/20; G06T 2207/20132; G06T
  2207/30201; G06T 7/00; G06T 7/10;
  G06T 2207/10052; G06T 2207/20084;
  G06T 3/0018; G06T 7/0008; G06T 7/11;
  G06T 7/50; G06T 7/557; G06T 7/593;
  B60T 2201/022; G06F 3/013
  See application file for complete search history.

(56) References Cited

U.S. PATENT DOCUMENTS

| | | | |
|---|---|---|---|
| 2016/0071418 A1* | 3/2016 | Oshida ................ | B60K 28/06 701/23 |
| 2020/0226790 A1 | 7/2020 | Alvarez et al. | |
| 2020/0363501 A1 | 11/2020 | Lau | |
| 2021/0114628 A1* | 4/2021 | Khurgin ............ | B60W 60/0023 |
| 2022/0126864 A1* | 4/2022 | Moustafa ......... | G08G 1/096775 |
| 2022/0237277 A1* | 7/2022 | Rahman ............... | G06V 10/762 |

* cited by examiner

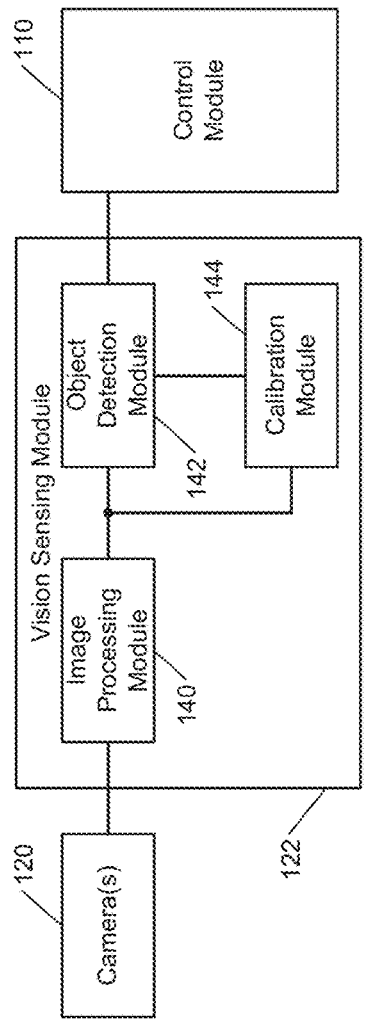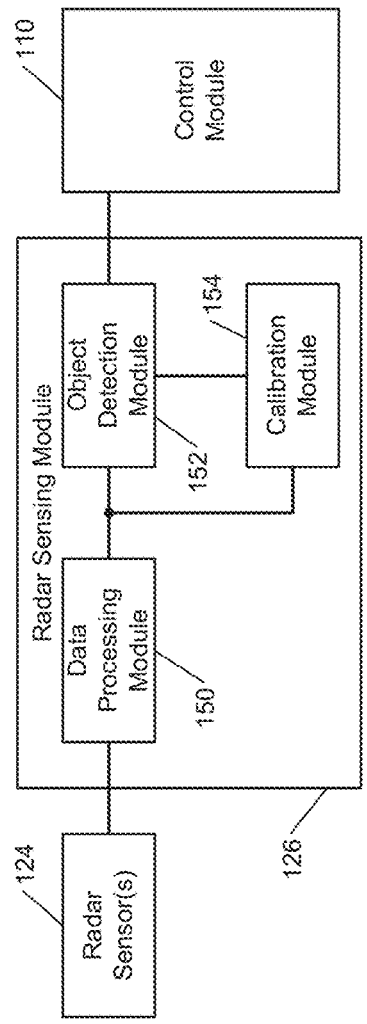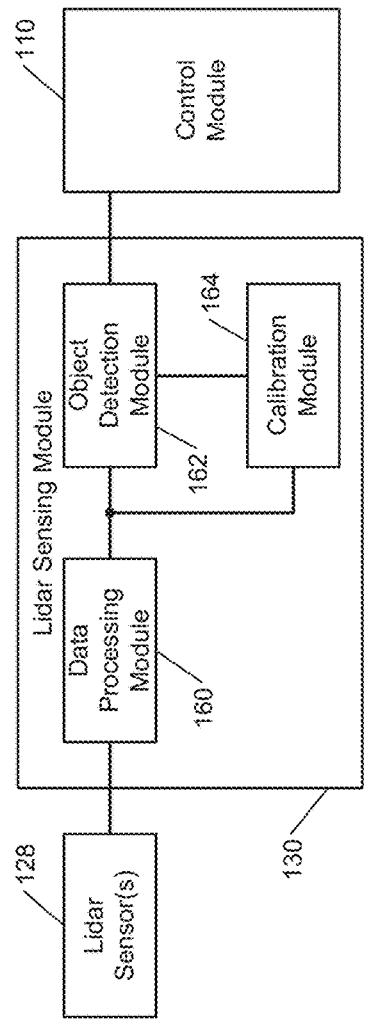

TAGGING OBJECTS WITH FAULT OVERRIDE PATTERNS DURING CALIBRATION OF VEHICLE SENSING SYSTEMS

FIELD

The present disclosure relates generally to calibrating automotive sensing systems and more particularly to tagging objects with fault override patterns during calibration of vehicle sensing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many modern vehicles including autonomous and semi-autonomous vehicles include various sensing systems. Examples of the sensing systems include vision sensing systems that include various cameras mounted inside and outside the vehicles, radar sensing systems, Lidar sensing systems, and so on. Before shipping an assembled vehicle from the factory, these sensing systems are calibrated. During use, some of these sensing systems need to be recalibrated when the sensing systems are repaired or replaced.

SUMMARY

A vision sensing system of a vehicle comprising a camera, an object detection module, and a calibration module. The object detection module is configured to detect a first object in data received from the camera. The calibration module is configured to calibrate the object detection module to detect the first object in the presence of a second object that obstructs a view of the camera and that includes a predetermined pattern sensed by the camera.

In another feature, the second object is used to calibrate a second sensing system of the vehicle.

In another feature, the second sensing system includes one of a radar sensing system and a Lidar sensing system.

In another feature, the object detection module is configured to not detect a fault in response to detecting the second object obstructing the view of the camera.

In another feature, the object detection module is configured to detect a fault in response to the second object obstructing the view of the camera for more than a predetermined period of time.

In other features, a system comprises the vision sensing system and a second sensing system of the vehicle that is calibrated concurrently with the vision sensing system using the second object.

In another feature, the calibration module is configured to disable the second sensing system for a predetermined period of time in response to detecting the second object.

In still other features, a driver monitoring system for a vehicle comprises a camera and a driver monitoring module. The camera is arranged proximate to a steering wheel of the vehicle to monitor a face of a driver of the vehicle. The driver monitoring module is configured to detect an obstruction between the camera and the face of the driver. The driver monitoring module is configured to ignore the obstruction in response to the obstruction including a predetermined pattern sensed by the camera.

In another feature, the driver monitoring module is configured to ignore the obstruction for a predetermined period of time in response to the obstruction including the predetermined pattern sensed by the camera.

In another feature, the driver monitoring module is configured to alert the driver in response to the obstruction persisting for more than a predetermined period of time.

In another feature, the driver monitoring module is configured to trigger a pull-over procedure for the vehicle in response to the obstruction persisting for more than a predetermined period of time.

In another feature, the driver monitoring module is configured to disable the camera in response to detecting the obstruction.

In still other features, a method for calibrating a vision sensing system of a vehicle comprises detecting a first object in data received from a camera of the vision sensing system of the vehicle. The method comprises calibrating the vision sensing system to detect the first object in the presence of a second object obstructing a view of the camera in response to the camera sensing a predetermined pattern on the second object.

In another feature, the method further comprises calibrating a second sensing system of the vehicle using the second object.

In another feature, the second sensing system includes one of a radar sensing system and a Lidar sensing system.

In another feature, the method further comprises disabling the second sensing system for a predetermined period of time in response to detecting the second object.

In another feature, the method further comprises not detecting a fault in response to detecting the second object obstructing the view of the camera.

In another feature, the method further comprises detecting a fault in response to the second object obstructing the view of the camera for more than a predetermined period of time.

In another feature, the method further comprises calibrating a second sensing system of the vehicle using the second object while calibrating the vision sensing system.

In still other features, a method for monitoring a driver of a vehicle comprises monitoring a face of the driver using a camera arranged proximate to a steering wheel of the vehicle. The method comprises detecting an obstruction between the camera and the face of the driver. The method comprises ignoring the obstruction in response to the obstruction including a predetermined pattern sensed by the camera.

In another feature, the method further comprises ignoring the obstruction for a predetermined period of time in response to the obstruction including the predetermined pattern sensed by the camera.

In another feature, the method further comprises alerting the driver in response to the obstruction persisting for more than a predetermined period of time.

In another feature, the method further comprises triggering a pull-over procedure for the vehicle in response to the obstruction persisting for more than a predetermined period of time.

In another feature, the method further comprises disabling the camera in response to detecting the obstruction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 shows a block diagram of a vision sensing system of the vehicle;

FIG. 3 shows a block diagram of a radar sensing system of the vehicle;

FIG. 4 shows a block diagram of a Lidar sensing system of the vehicle;

In the drawings, reference numbers may be reused to identify similar and/or identical elements.

DETAILED DESCRIPTION

Figure 1:
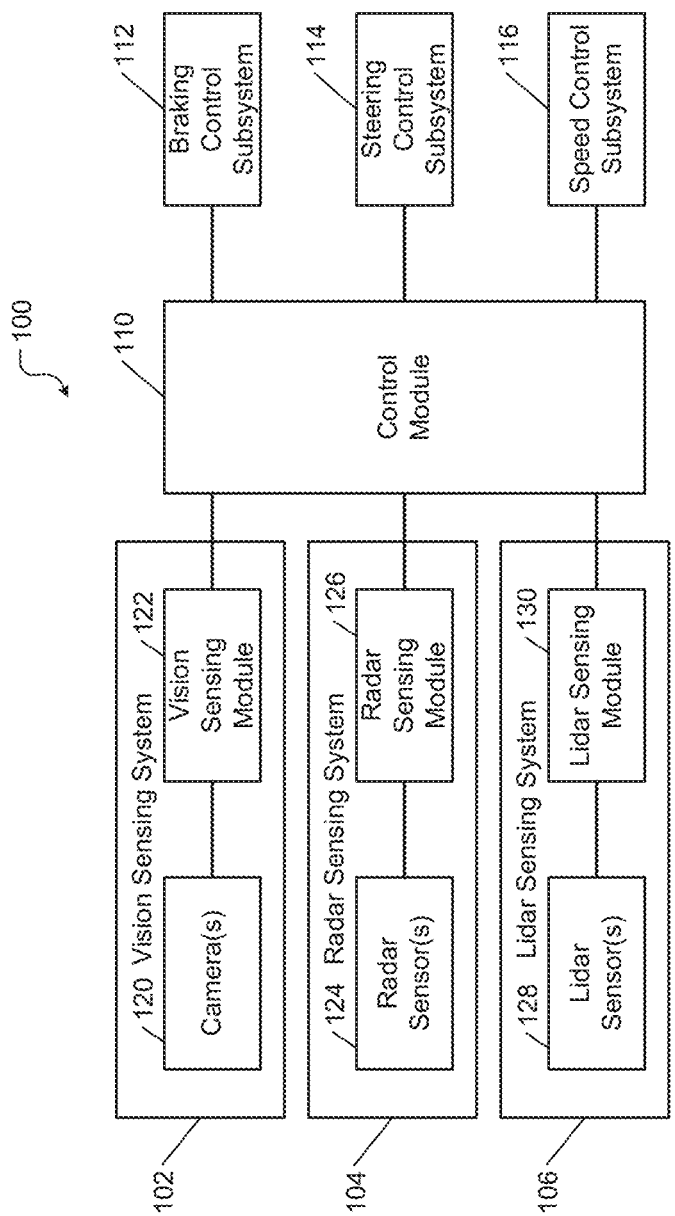
FIG. 1 shows a block diagram of a control system of a vehicle including various sensing systems, a control module, and various subsystems of the vehicle.

Targets such as stationary objects including visual patterns, moving objects, and so on are typically used to calibrate various sensing systems of a vehicle. For example, one or more cameras of a vision sensing system of the vehicle may be calibrated using stationary objects including visual patterns. For example, a radar sensing system and/or a Lidar sensing system of the vehicle may be calibrated using both stationary as well as moving objects used as targets. The targets used to calibrate the radar sensing system and/or Lidar sensing system may interfere with the calibration of the vision sensing system. For example, the targets used to calibrate the radar sensing system and/or Lidar sensing system may obstruct the view of the cameras of the vision sensing system. Therefore, these sensing systems are typically calibrated separately, which is time-consuming.

Further, the space around the vehicle where these calibrations are performed may inadvertently present other obstructions to the calibration of the vision sensing system. For example, the other obstructions may include people (e.g., factory workers, service technicians, etc.) walking through the space, other inanimate objects (e.g., trolleys, moving machine parts, robots, etc.) moving within the space, and so on. If a target used to calibrate the radar sensing system and/or Lidar sensing system or another obstruction interferes with the calibration of the vision sensing system, the vision sensing system detects these obstructions and indicates that an error has occurred in the calibration process.

The present disclosure solves the above problems by tagging a target or an obstruction with a pattern that can be sensed by the cameras of the vision sensing system during calibration. For example, the tag may include a QR code, a bar code, or any other machine readable marking that can be recognized by the cameras of the vision sensing system. The vision sensing system can be programmed such that when a camera of the vision sensing system senses the tag, the vision sensing system ignores the obstruction for a predetermined period of time and does not indicate that an error has occurred. If the obstruction is transitory (i.e., temporary) and ceases to obstruct the camera after the predetermined period of time, the calibration of the vision sensing system can continue uninterrupted and unhindered by the obstruction. If the obstruction continues to obstruct the camera beyond the predetermined period of time, the vision sensing system interprets the obstruction as an error.

Accordingly, tags including predetermined patterns can be used to facilitate concurrent calibration of multiple sensing systems of the vehicle as follows. For example, the cameras of the vision sensing system may be calibrated using one or more first targets that are stationary and that are located in a space around the vehicle. For example, the first targets may include objects with visual patterns such as chessboards that can be sensed by the cameras and that can be detected by the vision sensing system. Additionally, while the vision sensing system is being calibrated, the radar sensing system and/or the Lidar sensing system may also be calibrated at the same time and in the same space using second targets. For example, the second targets may include objects that may be stationary or may move within the space around the vehicle.

The second targets used to calibrate the radar sensing system and/or the Lidar sensing system may interfere with the calibration of the vision sensing system. Accordingly, the second targets can be tagged with tags including a QR code, a bar code, or any other machine readable marking that can be detected by the cameras and can be recognized by the vision sensing system. The vision sensing system can be programmed to sense the tags on the second targets. The vision sensing system can be programmed to ignore the second targets for a predetermined period of time after sensing any of the tags on the second targets. If the second targets cease to obstruct the camera after the predetermined period of time, the vision sensing system does not indicate a fault, and the calibration process of the vision sensing system continues without an error due to the obstruction. If the obstruction due to any of the second targets persists after the predetermined period of time, the vision sensing system indicates a fault, and the calibration process of the vision system halts until the obstruction is removed.

The application of the tags is not limited to the objects used to calibrate the radar sensing system and/or the Lidar sensing system. Rather, the tags can be applied to other objects that may inadvertently move within the space where the vision sensing system is being calibrated. For example, the tags can be placed on hats or apparel worn by workers working in the space. The tags can be placed on other objects (moving and stationary) within the space such as machine parts, robots, trolleys, etc. The vision sensing system can be programmed to process these tags as described above.

The tagging mechanism can also be used to solve additional problems. For example, in some vehicles (e.g., semi-autonomous vehicles), a driver monitoring system (DMS) uses a camera to continuously monitor a driver (e.g., to check if the driver is attentive). While installing a steering wheel in such vehicles, a tool used to adjust the steering wheel may obstruct the view of the camera. The DMS typically indicates a fault upon sensing the obstruction caused by the tool. According to the present disclosure, the tool can be tagged, and the DMS can be programmed to sense the tag on the tool. Then while installing the steering wheel, the DMS can sense the tag on the tool and ignore the obstruction of the camera due to the tool instead of indicating the obstruction as a fault.

Furthermore, when calibrating the vision sensing system, instead of detecting a target used to calibrate the radar sensing system or the Lidar sensing system, if the vision sensing system detects a worker wearing a tagged gear (e.g., hat or eye-glasses), the vision sensing system can provide an indication to the other sensing system (e.g., the Lidar sensing system) that a worker is present in its vicinity. To protect the worker from potentially harmful radiation such as laser used by the Lidar sensing system, the Lidar sensing system can temporarily disable itself (e.g., turn off or enter a standby mode), where the power of the laser is lowered so as to not harm the worker present in its vicinity. When the vision sensing system detects (based on the tag on the gear) that the worker is no longer present in the vicinity, the Lidar sensing system can resume operating normally (e.g., calibration), with the laser operating at normal power.

Similarly, depending on the information on the tag, the driver monitoring system can also detect that a worker (e.g., a technician) instead of the calibration tool is in the vicinity of the camera used by the driver monitoring system. The camera of the driver monitoring system normally transmits infrared radiation to detect a driver's face. To protect the worker's eyes from the infrared radiation transmitted by the camera, the driver monitoring system can detect the tag on the worker's gear (e.g., hat or eye-glasses) and turn off the camera or lower the transmission power of the camera.

These and other features of the present disclosure are now described below in further detail. Throughout the present disclosure, the vision sensing system, the radar sensing system, and the Lidar sensing system of a vehicle are used only as illustrative examples of sensing systems used in vehicles. The teachings of the present disclosure apply to any sensing system used in vehicles.

The present disclosure is organized as follows. A control system of a vehicle including various sensing systems, a control module, and various subsystems of the vehicle is initially shown and described with reference to FIG. 1. The various sensing systems are shown and described in further detail with reference to FIGS. 2-4. An example of calibrating the various sensing systems is shown and described with reference to FIG. 5. A method of calibrating the various sensing systems is shown and described with reference to FIG. 6. An example of a driver monitoring system is shown and described with reference to FIG. 7. A method of operating the driver monitoring system according to the present disclosure is shown and described with reference to FIG. 8.

FIG. 1 shows a block diagram of a control system 100 of a vehicle. For example, the control system 100 comprises a vision sensing system 102, a radar sensing system 104, and a Lidar sensing system 106. The control system 100 comprises a control module 110 that communicates with the vision sensing system 102, the radar sensing system 104, and the Lidar sensing system 106. Based on data received from the vision sensing system 102, the radar sensing system 104, and the Lidar sensing system 106, the control module 110 controls one or more subsystems of the vehicle. Non-limiting examples of the subsystems of the vehicle include a braking control subsystem 112, a steering control subsystem 114, and a speed control subsystem 116.

The braking control subsystem 112 controls braking of the vehicle based on the data received from the vision sensing system 102, the radar sensing system 104, and the Lidar sensing system 106. The steering control subsystem 114 controls steering of the vehicle based on the data received from the vision sensing system 102, the radar sensing system 104, and the Lidar sensing system 106. The speed control subsystem 116 controls the speed of the vehicle based on the data received from the vision sensing system 102, the radar sensing system 104, and the Lidar sensing system 106.

The vision sensing system 102 includes one or more cameras 120 and a vision sensing module 122. The cameras 120 monitor surroundings of the vehicle. The vision sensing module 122 processes data received from the cameras 120, detects objects around the vehicle, and outputs information about the detected objects to the control module 110.

The radar sensing system 104 includes one or more radar sensors 124 and a radar sensing module 126. The radar sensors 124 scan the surroundings of the vehicle. The radar sensing module 126 processes data received from the radar sensors 124, detects objects around the vehicle, and outputs information about the detected objects to the control module 110.

The Lidar sensing system 106 includes one or more Lidar sensors 128 and a Lidar sensing module 130. The Lidar sensors 128 scan the surroundings of the vehicle. The Lidar sensing module 130 processes data received from the Lidar sensors 128, detects objects around the vehicle, and outputs information about the detected objects to the control module 110. The vision sensing module 122, the radar sensing module 126, and the Lidar sensing module 130 are shown and described in further detail with reference to FIGS. 2-4.

FIG. 2 shows the vision sensing module 122 in further detail. The vision sensing module 122 comprises an image processing module 140, an object detection module 142, and a calibration module 144. The image processing module 140 processes pixel data of images captured by the cameras 120. For example, the image processing module 140 can filter the data, adjust the brightness and contrast of the data, and so on. The object detection module 142 detects objects in the data captured by the cameras 120. For example, the object detection module 142 comprises one or more trained models (e.g., neural networks) that can identify objects in the data captured by the cameras 120.

Some parameters associated with the cameras 120 such as mounting of the cameras 120, resolution of the cameras 120, and so on may differ slightly from vehicle to vehicle. To accurately detect the objects regardless of such variations, the calibration module 144 calibrates the object detection module 142 after the vision sensing system 102 is installed in the vehicle (e.g., during manufacture or after repair/replacement). An example of the calibration process is shown and described with reference to FIG. 5.

FIG. 3 shows the radar sensing module 126 in further detail. The radar sensing module 126 comprises a data processing module 150, an object detection module 152, and a calibration module 154. The data processing module 150 processes data from the radar sensors 124. For example, the data processing module 150 can filter the data, cancel noise from the data, and so on. The object detection module 152 detects objects in the data received by the radar sensors 124. For example, the object detection module 152 comprises one or more trained models (e.g., neural networks) that can identify objects in the data received by the radar sensors 124.

Some parameters associated with the radar sensors 124 such as mounting of the radar sensors 124, the frequencies of the radar signals used to sense objects around the vehicle, and so on may differ slightly from vehicle to vehicle. To accurately detect the objects regardless of such variations, the calibration module 154 calibrates the object detection module 152 after the radar sensing system 104 is installed in the vehicle (e.g., during manufacture or after repair/replacement). An example of the calibration process is shown and described with reference to FIG. 5.

FIG. 4 shows the Lidar sensing module 130 in further detail. The Lidar sensing module 130 comprises a data processing module 160, an object detection module 162, and a calibration module 164. The data processing module 160 processes point cloud data of the surroundings of the vehicle captured by the Lidar sensors 128. For example, the data processing module 160 can filter the point cloud data, remove outliers from the data, and so on. The object detection module 162 detects objects in the point cloud data received by the Lidar sensors 128. For example, the object detection module 162 comprises one or more trained models (e.g., neural networks) that can identify objects in the point cloud data received by the Lidar sensors 128.

Some parameters associated with the Lidar sensors 128 such as mounting of the Lidar sensors 128, various properties of the laser signals used to sense objects around the vehicle, and so on may differ slightly from vehicle to vehicle. To accurately detect the objects regardless of such variations, the calibration module 164 calibrates the object detection module 162 after the Lidar sensing system 106 is installed in the vehicle (e.g., during manufacture or after repair/replacement). An example of the calibration process is shown and described with reference to FIG. 5.

Figure 5:
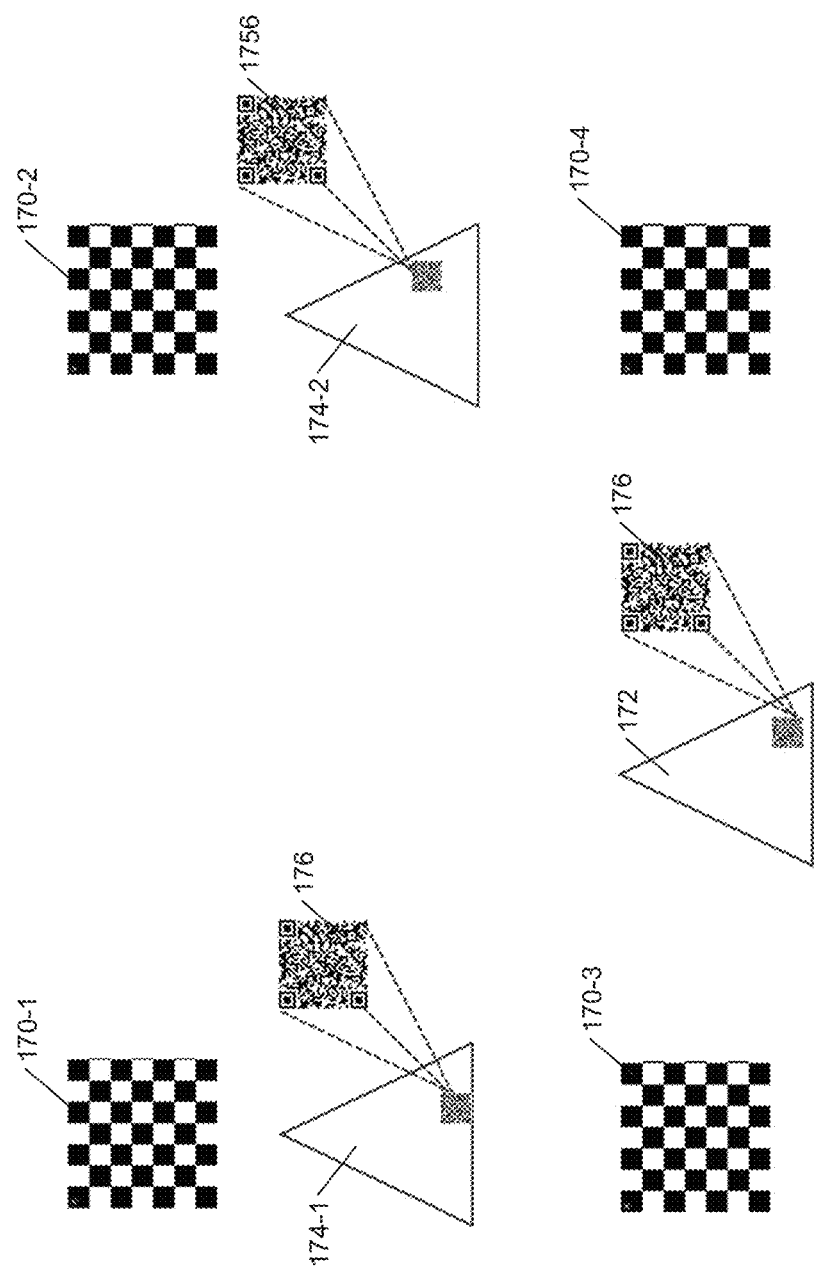
FIG. 5 shows an example setup of objects used to calibrate the various sensing systems of the vehicle according to the present disclosure.

FIG. 5 shows examples of targets used in factories and dealerships to calibrate the vision sensing module 122, the radar sensing module 126, and the Lidar sensing module 130 of a vehicle. For example, targets 170-1, 170-2, 170-2, and 170-4 (collectively the targets 170) may be used to calibrate the cameras 120 of the vision sensing module 122. For example, the targets 170 may include a chessboard pattern and may be stationary. Additionally, pyramid-shaped targets may be used to calibrate the radar sensing module 126 and the Lidar sensing module 130. For example, a target 172 may be used to calibrate the radar sensing module 126. For example, targets 174-1 and 174-2 (collectively the targets 174) may be used to calibrate the Lidar sensing module 130.

The targets 172 and 174 may be tagged with tags 176 including predetermined patterns (e.g., QR codes). The calibration module 144 of the vision sensing module 122 is programmed to recognize the tags 176. The calibration module 144 is programmed to ignore the targets 172 and 174 upon sensing the tags 176 on the targets 172 and 174 during the calibration of the vision sensing module 122 as described below in detail with reference to FIG. 6. While not shown, the tags 176 may also be affixed on other objects (e.g., workers' gear, machinery, etc.) that may be present in the space around the vehicle and that may interfere with the calibration of the vision sensing module 122.

Figure 6:
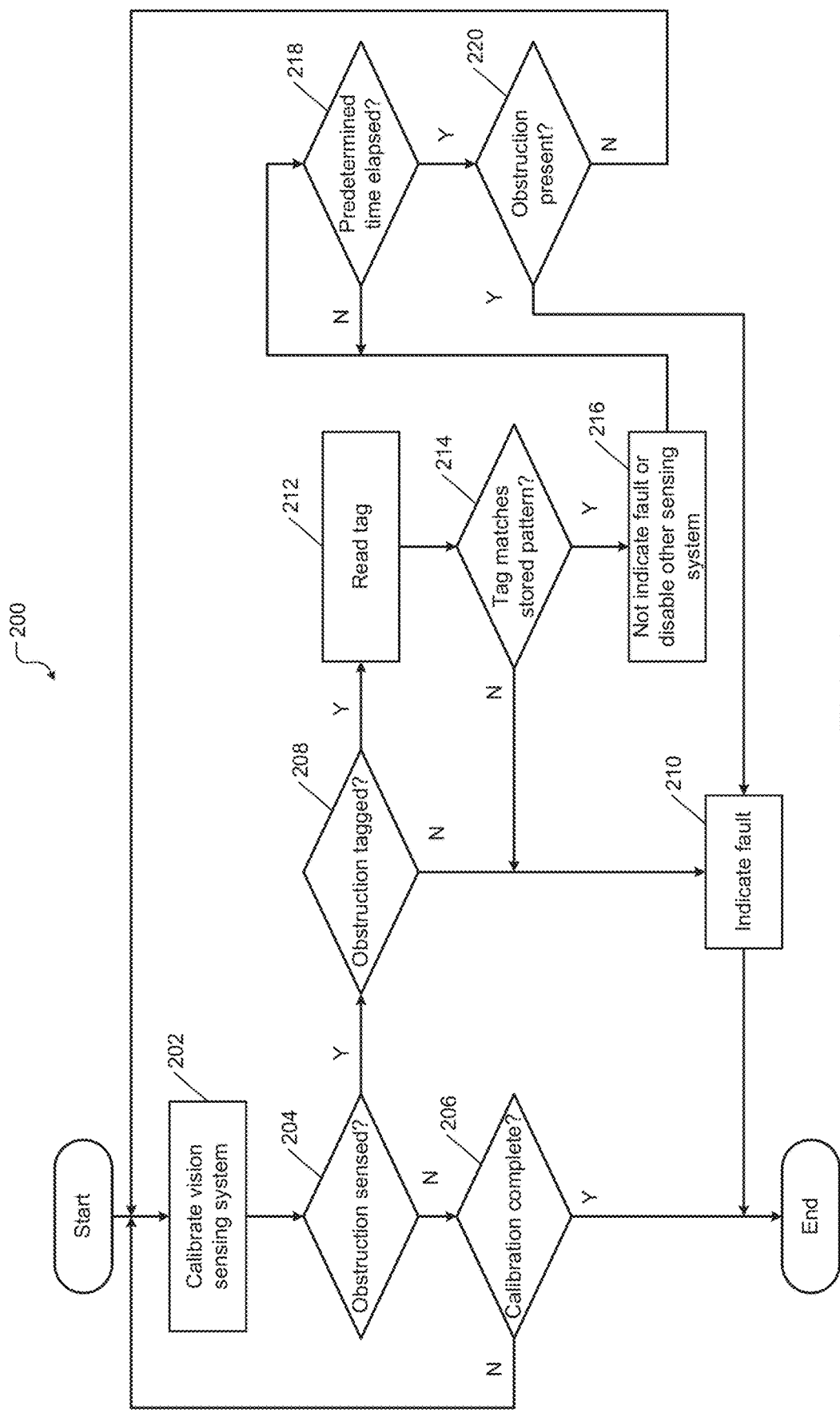
FIG. 6 shows a method of calibrating the various sensing systems using the setup of objects shown in FIG. 5.

FIG. 6 shows a method 200 performed by the calibration module 144 during the calibration of the vision sensing module 122. The calibration module 144 performs the method 200 while calibrating the vision sensing module 122 using the targets 170. The calibration module 144 performs the method 200 while calibrating the vision sensing module 122 in the presence of the other targets 172 and 174. Accordingly, the calibration module 144 performs the method 200 while the calibration modules 154 and 164 are concurrently calibrating the radar sensing module 126 and the Lidar sensing module 130, respectively.

At 202, the calibration module 144 begins calibrating the vision sensing module 122 using the cameras 120 and the targets 170. At 204, the calibration module 144 determines if any of the cameras 120 detected an obstruction. The method 200 proceeds to 206 if the cameras 120 did not detect an obstruction. At 206, the calibration module 144 determines if the calibration of the vision sensing module 122 is complete. The method returns to 202 if the calibration of the vision sensing module 122 is incomplete. The method 200 ends if the calibration of the vision sensing module 122 is complete.

At 204, if any of the cameras 120 detected an obstruction, the method 200 proceeds to 208. At 208, the calibration module 144 determines if the cameras 120 sensed the tag 176 on the obstruction. For example, the obstruction may include any of the targets 172, 174 used by the calibration modules 154, 164 to calibrate the radar sensing module 126 and the Lidar sensing module 130, respectively. Alternatively or additionally, the obstruction may include another object (e.g., a worker's gear, or a machine part, etc.) that includes the tag 176. In some situations, the obstruction may include an object that does not include the tag 176.

The method 200 proceeds to 210 if the cameras 120 do not sense the tag 176 on the obstruction. At 210, the calibration module 144 indicates that a fault occurred during the calibration of the vision sensing module 122 due to the obstruction, and the method 200 ends. Alternatively, the method 200 proceeds to 212 if the cameras 120 sense the tag 176 on the obstruction. At 212, the calibration module 144 reads the tag 176 on the obstruction. The calibration module 144 is programmed to interpret the tag 176 as follows.

At 214, the calibration module 144 determines if the tag 176 includes the predetermined pattern (e.g., the QR code) that is known to be affixed on the targets 172, 174 used to calibrate the radar sensing module 126 and the Lidar sensing module 130, or on other objects (e.g., a worker's gear, or a moving machine part, etc.) that are expected to be present in the space around the vehicle. The method 200 proceeds to 210 if the tag 176 does not include the predetermined pattern (i.e., the obstruction sensed by the cameras 120 is an actual obstruction). The method proceeds to 216 if the tag 176 includes the predetermined pattern (i.e., the obstruction sensed by the cameras 120 is not an actual obstruction but is one of the targets 172, 174 or one of the other objects expected to be present in the space around the vehicle). At 216, the calibration module 144 does not indicate that a fault occurred in the calibration of the vision sensing module 122 due to the obstruction sensed by the cameras 120.

For example, the tag 176 may include a first pattern if the tag 176 is affixed on the targets 172, 174. Alternatively, the tag 176 may include a second pattern if the tag 176 is affixed on a worker's gear (e.g., hat, eye-glasses, etc.). To distinguish between the targets 172, 174 and a worker, the second pattern is different than the first pattern. If the calibration module 144 determines that the tag 176 includes the first pattern, the calibration module 144 does not indicate that a fault occurred in the calibration of the vision sensing module 122 due to the obstruction sensed by the cameras 120.

Alternatively, if the calibration module 144 determines that the tag 176 includes the second pattern, the calibration module 144 may not only not indicate fault but may additionally inform the other sensing system being calibrated (e.g., the Lidar sensing system 130) that a worker is in the vicinity of the other sensing system. To protect the worker from laser or other potentially harmful radiation used by the other sensing system, the other sensing system can temporarily turn itself off (i.e., disable itself or operate in a standby mode) or lower the power of its radiation.

At 218, the calibration module 144 determines if a predetermined amount of time has elapsed since the sensing of the obstruction by the cameras 120. The method 200 waits until the predetermined amount of time has elapsed since the sensing of the obstruction by the cameras 120. The method 200 proceeds to 220 after the predetermined amount of time has elapsed since the sensing of the obstruction by the cameras 120.

At 220, the calibration module 144 determines if the obstruction sensed by the cameras 120 is still present. The method 200 returns to 202 if the obstruction sensed by the cameras 120 is no longer present; and based on such indication from the calibration module 144, if the tag 176 read at 212 included the second pattern, the other sensing system is enabled (i.e., turned on) or resumes operating (e.g., calibrating) with normal power. The method 200 returns to 210 if the obstruction sensed by the cameras 120 is still present; and based on such indication from the calibration module 144, if the tag 176 read at 212 included the second pattern, the other sensing system remains disabled (i.e., turned off or in the standby mode) or operates at lower power. The predetermined amount of time can be programmed to allow completion of the calibration procedures.

Figure 7:
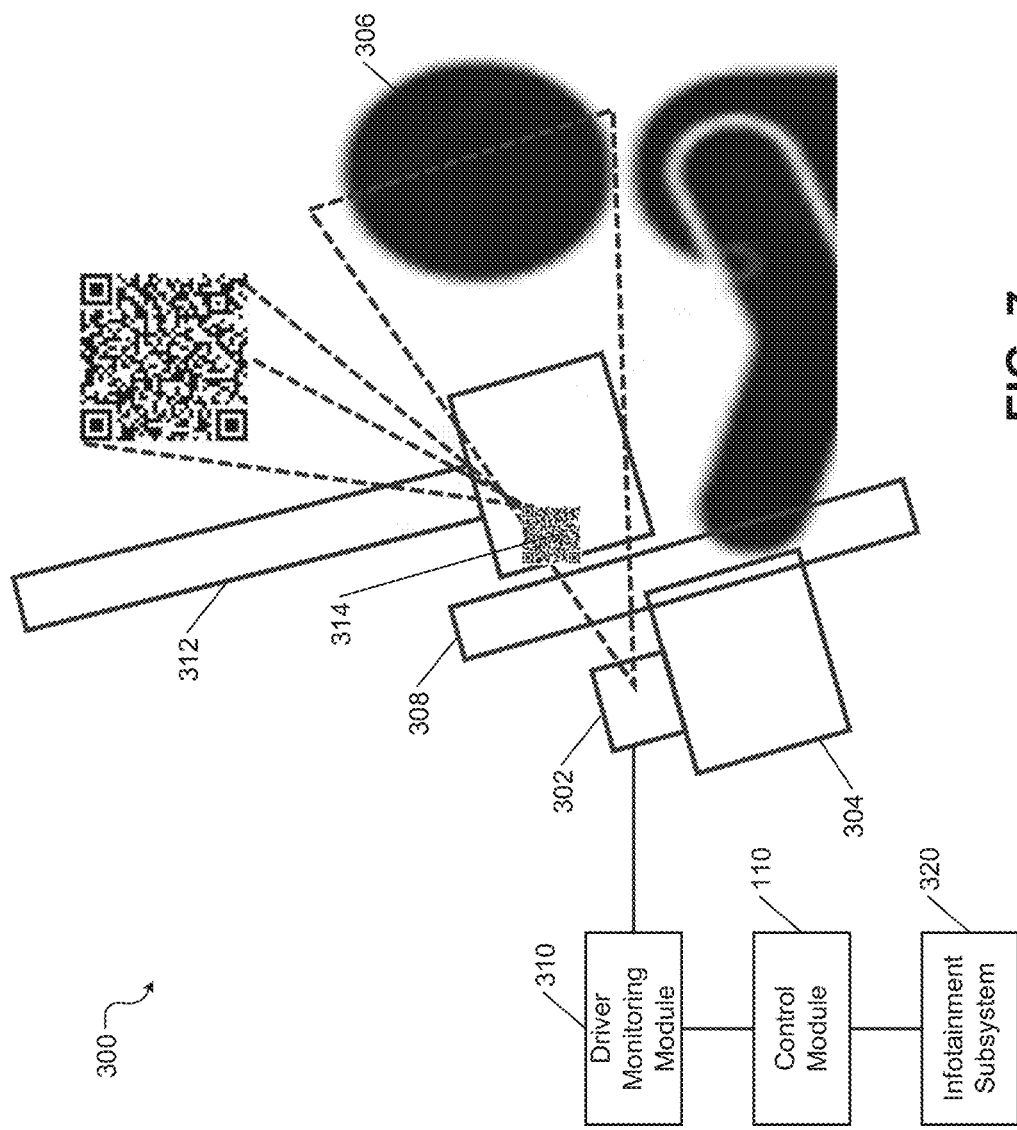
FIG. 7 shows an example of a driver monitoring system.

FIG. 7 shows an example of a driver monitoring system 300. The driver monitoring system 300 comprises a camera 302 and a driver monitoring module 310. The camera 302 is mounted to a steering column 304 of the vehicle. The camera 302 constantly monitors a driver's face 306. Based on data received from the camera 302, the driver monitoring module 310 determines if the driver is paying attention to the road ahead. If a dangerous situation is detected (e.g., by any of the vision sensing system 102, the radar sensing system 104, and the Lidar sensing system 106), the driver monitoring module 310 warns the driver using audiovisual mechanisms provided on an infotainment subsystem 320 of the vehicle. For example, the driver monitoring module 310 may flash lights, sound an alarm, vibrate one or more seats, and/or vibrate the steering wheel, etc. to alert the driver as well as other occupants of the vehicle. If no action is taken by the driver within a predetermined amount of time, the control module 110 informs one or more of the braking control subsystem 112, the steering control subsystem 114, and the speed control subsystem 116 to safely pull over the vehicle.

The driver monitoring system 300 registers a fault when installing a steering wheel 308, which places an adjustment apparatus 312 in front of the camera 302 (i.e., between the camera 302 and the driver's face 306). A tag 314 with a predetermined pattern (e.g., a QR code) can be placed on a portion of the adjustment apparatus 312 facing the camera 302. By sensing the tag 314 through the camera 302, the driver monitoring module 310 can determine that the view of the camera 302 is blocked for a legitimate reason (i.e., the adjustment apparatus 312 is not an illegitimate obstruction).

Accordingly, upon sensing the tag 314 through the camera 302, the driver monitoring module 310 can temporarily deactivate the driver monitoring function until the tag 314 is no longer in view. If an object obstructing the camera 302 does not have the tag 314, the driver monitoring module 310 can determine that the object is an actual obstruction. In response, the driver monitoring module 310 can be programmed to trigger one or more fault-based mitigating operations such as providing one or more alerts to the driver and safely pulling over the vehicle. The operations of the driver monitoring module 310 are described in further detail with reference to FIG. 8.

Figure 8:
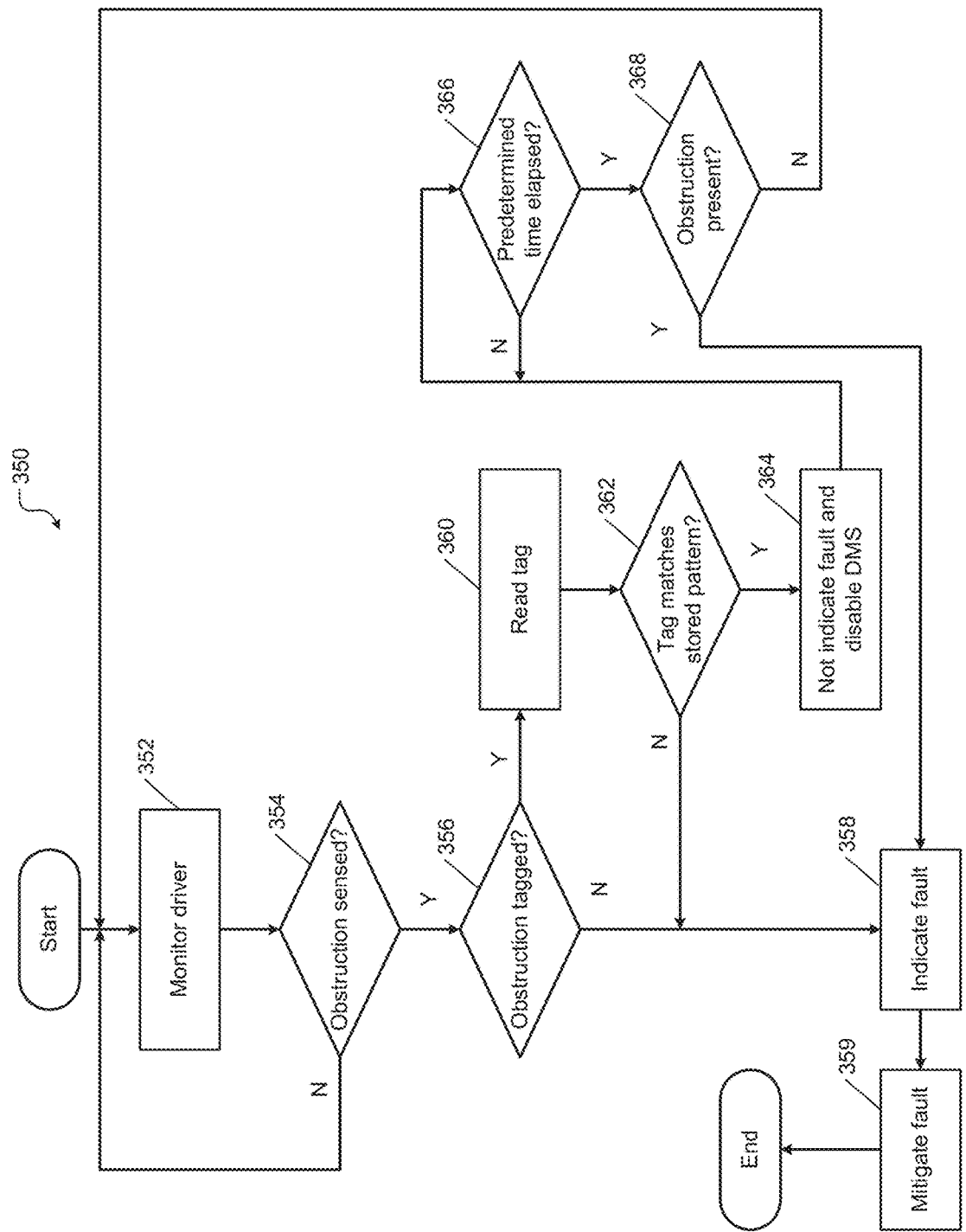
FIG. 8 shows a method of operating the driver monitoring system according to the present disclosure.

FIG. 8 shows a method 350 performed by the driver monitoring module 310. At 352, the driver monitoring module 310 begins monitoring the driver's face 306 using the camera 302. At 354, the driver monitoring module 310 determines if the camera 302 detected an obstruction. The method 350 returns to 352 if the camera 302 did not detect an obstruction. The method 350 proceeds to 354 if the camera 302 detects an obstruction. At 354, the driver monitoring module 310 determines if the camera 302 sensed the tag 314 on the obstruction. For example, the obstruction may include the adjustment apparatus 312 that includes the tag 314 or a worker (e.g., technician) wearing a gear (e.g., a hat, eye-glasses, etc.) that includes the tag 314. Alternatively, the obstruction may include an object that does not include the tag 314.

The method 350 proceeds to 358 if the camera 302 does not sense the tag 314 on the obstruction. At 358, the driver monitoring module 310 indicates that a fault occurred while monitoring the driver due to the obstruction. At 359, the method 350 initiates one or more procedures to mitigate the fault (e.g., provides audiovisual and/or tactile alerts to the driver; and/or causes a safe pull over of the vehicle), and the method 350 ends. Alternatively, the method 350 proceeds to 360 if the camera 302 senses the tag 314 on the obstruction. At 360, the driver monitoring module 310 reads the tag 314 on the obstruction. The driver monitoring module 310 is programmed to interpret the tag 314 as follows.

At 362, the driver monitoring module 310 determines if the tag 314 includes the predetermined pattern (e.g., the QR code) that is known to be affixed on the adjustment apparatus 312 used to calibrate the steering wheel 308, or on a worker's gear. The method 350 proceeds to 358 if the tag 314 does not include the predetermined pattern (i.e., the obstruction sensed by the camera 302 is an actual obstruction). The method 350 proceeds to 364 if the tag 314 includes the predetermined pattern (i.e., the obstruction sensed by the camera 302 is not an actual obstruction but is the adjustment apparatus 312 used to calibrate the steering wheel 308 or is a worker such as a technician). At 364, the driver monitoring module 310 does not indicate that a fault occurred due to the obstruction sensed by the camera 302.

For example, the tag 314 may include a first pattern if the tag 314 is affixed on the adjustment apparatus 312. Alternatively, the tag 314 may include a second pattern if the tag 314 is affixed on a worker's gear (e.g., hat, eye-glasses, etc.). To distinguish between the adjustment apparatus 312 and a worker, the second pattern is different than the first pattern. If the driver monitoring module 310 determines that the tag 314 includes the first pattern, the driver monitoring module 310 does not indicate that a fault occurred due to the obstruction sensed by the camera 302.

Alternatively, if the driver monitoring module 310 determines that the tag 314 includes the second pattern, the driver monitoring module 310 may not only not indicate fault but additionally sense or determine that a worker is in the vicinity of the camera 302. To protect the worker's eyes from potentially harmful radiation (e.g., infrared light) from the camera 302, the driver monitoring module 310 can temporarily turn off the camera 302 (i.e., disables itself or enters into a standby mode) or lowers the power of its radiation.

At 366, the driver monitoring module 310 determines if a predetermined amount of time has elapsed since the sensing of the obstruction by the camera 302. The method 350 waits until the predetermined amount of time has elapsed since the sensing of the obstruction by the camera 302. The method 350 proceeds to 368 after the predetermined amount of time has elapsed since the sensing of the obstruction by the camera 302.

At 368, the driver monitoring module 310 determines if the obstruction sensed by the camera 302 is still present. The method 350 returns to 352 if the obstruction sensed by the camera 302 is no longer present; and based on such determination, if the tag 314 read at 360 included the second pattern, the driver monitoring module 310 enables itself (i.e., exits standby mode or turns on the camera 302) and resumes operating (e.g., monitoring) with normal power. The method 350 returns to 358 if the obstruction sensed by the camera 302 is still present; and based on such determination, if the tag 314 read at 360 included the second pattern, the driver monitoring module 310 keeps the camera 302 disabled (i.e., turned off or in the standby mode) or operating at a lower than normal power. The predetermined amount of time can be programmed to allow completion of the calibration.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driver monitoring system for a vehicle comprising:
a camera arranged proximate to a steering wheel of the vehicle to monitor a face of a driver of the vehicle;
a driver monitoring module configured to:
detect a calibration obstruction between the camera and the face of the driver, the calibration obstruction used for calibration of at least one of: the camera, a radar sensing system, a LIDAR sensing system, and a vision sensing system; and
ignore the calibration obstruction in response to one of a predetermined QR code and a predetermined bar code being disposed on an exterior of the calibration obstruction and sensed by the camera; and
a calibration module configured to calibrate the at least one of the camera, the radar sensing system, the LIDAR sensing system, and the vision sensing system.

2. The driver monitoring system of claim 1 wherein the driver monitoring module is configured to ignore the calibration obstruction for a predetermined period of time in response to the one of the predetermined QR code and the predetermined bar code being sensed by the camera on the calibration obstruction.

3. The driver monitoring system of claim 1 wherein the driver monitoring module is configured to alert the driver in response to the calibration obstruction persisting for more than a predetermined period of time.

4. The driver monitoring system of claim 1 wherein the driver monitoring module is configured to trigger a pull-over procedure for the vehicle in response to the calibration obstruction persisting for more than a predetermined period of time.

5. The driver monitoring system of claim 1 wherein the driver monitoring module is configured to disable the camera in response to detecting the calibration obstruction.

6. A method for monitoring a driver of a vehicle, the method comprising:
monitoring a face of the driver using a camera arranged proximate to a steering wheel of the vehicle;
detecting a calibration obstruction between the camera and the face of the driver, the calibration obstruction used for calibration of at least one of: the camera, a radar sensing system, a LIDAR sensing system, and a vision sensing system; and
ignoring the calibration obstruction in response to one of a predetermined QR code and a predetermined bar code being disposed on an exterior of the calibration obstruction and sensed by the camera; and
calibrating the at least one of the camera, the radar sensing system, the LIDAR sensing system, and the vision sensing system.

7. The method of claim 6 further comprising ignoring the calibration obstruction for a predetermined period of time in response to the one of the predetermined QR code and the predetermined bar code being sensed by the camera.

8. The method of claim 6 further comprising alerting the driver in response to the calibration obstruction persisting for more than a predetermined period of time.

9. The method of claim 6 further comprising triggering a pull-over procedure for the vehicle in response to the calibration obstruction persisting for more than a predetermined period of time.

10. The method of claim 6 further comprising disabling the camera in response to detecting the calibration obstruction.

11. A monitoring system for a vehicle comprising:
a camera arranged proximate to a steering wheel of the vehicle to monitor a face of an occupant of a seat of the vehicle;
a monitoring module configured to:
detect a calibration obstruction between the camera and the face of the occupant, the calibration obstruction used for calibration of at least one of: the camera, a radar sensing system, a LIDAR sensing system, and a vision sensing system; and
ignore the calibration obstruction in response to one of a predetermined QR code and a predetermined bar code being disposed on an exterior of the calibration obstruction and sensed by the camera; and
a calibration module configured to calibrate the at least one of the camera, the radar sensing system, the LIDAR sensing system, and the vision sensing system.

12. The monitoring system of claim 11 wherein the monitoring module is configured to ignore the calibration obstruction for a predetermined period of time in response to the calibration obstruction including the one of the predetermined QR code and the predetermined bar code sensed by the camera.

13. The monitoring system of claim 11 wherein the monitoring module is configured to output an alert in response to the calibration obstruction persisting for more than a predetermined period of time.

14. The monitoring system of claim 11 wherein the monitoring module is configured to trigger a pull-over procedure for the vehicle in response to the calibration obstruction persisting for more than a predetermined period of time.

15. The monitoring system of claim 11 wherein the monitoring module is configured to disable the camera in response to detecting the calibration obstruction.

16. A method for monitoring an occupant of a seat of a vehicle, the method comprising:
monitoring a face of the occupant of the seat of the vehicle using a camera arranged proximate to a steering wheel of the vehicle;
detecting a calibration obstruction between the camera and the face of the occupant, the calibration obstruction used for calibration of at least one of: the camera, a radar sensing system, a LIDAR sensing system, and a vision sensing system;
ignoring the calibration obstruction in response to one of a predetermined QR code and a predetermined bar code being disposed on an exterior of the calibration obstruction and sensed by the camera; and
calibrating the at least one of the camera, the radar sensing system, the LIDAR sensing system, and the vision sensing system.

17. The method of claim 16 further comprising ignoring the calibration obstruction for a predetermined period of time in response to the calibration obstruction including the one of the predetermined QR code and the predetermined bar code sensed by the camera.

18. The method of claim 16 further comprising outputting an alert in response to the calibration obstruction persisting for more than a predetermined period of time.

19. The method of claim 16 further comprising triggering a pull-over procedure for the vehicle in response to the calibration obstruction persisting for more than a predetermined period of time.

20. The method of claim 16 further comprising disabling the camera in response to detecting the calibration obstruction.

\* \* \* \* \*